United States Patent
Campagnolo

[11] Patent Number: 5,975,646
[45] Date of Patent: Nov. 2, 1999

[54] RIM FOR A SPOKED WHEEL PARTICULARLY A BICYCLE REAR WHEEL

[75] Inventor: Valentino Campagnolo, Vicenza, Italy

[73] Assignee: Campagnolo S.r.l., Vicenza, Italy

[21] Appl. No.: 09/104,367

[22] Filed: Jun. 25, 1998

[30]  Foreign Application Priority Data

Feb. 10, 1998 [IT] Italy .................................. TO98A0101

[51] Int. Cl.[6] .................................................. B60B 21/06
[52] U.S. Cl. .................................................. 301/95; 301/58
[58] Field of Search .................................. 301/58, 95, 96, 301/97, 98, 110.5

[56]  References Cited

U.S. PATENT DOCUMENTS

| 5,228,756 | 7/1993 | Krampera | 301/58 |
| 5,653,510 | 8/1997 | Osborne | 301/95 |

FOREIGN PATENT DOCUMENTS

| 954877 | 1/1950 | France | 301/58 |
| 583902 | 8/1933 | Germany | 301/58 |
| 347089 | 4/1931 | United Kingdom | 301/58 |
| 436634 | 10/1935 | United Kingdom | 301/97 |
| 484183 | 7/1936 | United Kingdom | 301/97 |

*Primary Examiner*—Russell D. Stormer
*Attorney, Agent, or Firm*—Sughrue, Mion, Zinn Macpeak & Seas, PLLC

[57]  ABSTRACT

A rim of a spoked wheel, particularly for a bicycle rear wheel, comprises a hollow profile which the wheel arranged on a plane which is offset with respect to the median plane of the rim. the profile includes a reinforcing radial wall arranged in the cavity of the profile and connecting the radially inner wall to the radially outer wall of the profile. This reinforcing radial wall is also offset with respect to median plane of the rim.

6 Claims, 5 Drawing Sheets

RIM FOR A SPOKED WHEEL PARTICULARLY A BICYCLE REAR WHEEL

BACKGROUND OF THE INVENTION

The present invention relates to a rim for a bicycle spoked wheel, particularly a bicycle rear wheel, of the type comprising a hollow profile having a radially inner wall, a radially outer wall, and two side portions connecting said walls with each other, said radially inner wall having a plurality of spoke anchoring spots, said anchoring spots being arranged on a plane offset with respect to a median plane orthogonal to the rim axis and equally spaced apart from the side portions thereof.

A rim of the above indicated type is described and illustrated for example in European patent EP-B-0 494 277, in corresponding U.S. Pat. No. 5,228,756 and in German utility model G 89 12 606.8.

FIG. 1 of the annexed drawings shows a partial cross-section of a bicycle rear wheel made according to the prior art. Reference numeral 1 generally designates the rim, constituted by a hollow metal profile, having a radially inner wall 2, a radially outer wall 3 and a pair of side portions 4, 5. Reference numeral 6 generally designates the hub of the wheel (shown only partially) having an axis 7. Since the hub 6 is a hub of a rear wheel, it is adapted to carry a number of sprockets able to selectively engage the bicycle chain. According to the conventional art, the sprocket cluster (not shown) is mounted on a freewheel unit 8 arranged on one end of the wheel hub 6. The hub 6 also has a pair of circumferential flanges 9, 10, one arranged adjacent to the freewheel unit 8, the other flange being adjacent to the opposite end of the hub 6. the two flanges 9, 10 are used for connection of the ends of two series of spokes 11, 12 (shown only diagrammatically in the annexed drawings) which are arranged substantially on two conical surfaces having a common base in a plane 13 orthogonal to the axis 7 of the hub 6 and rim 3, and apices located on opposite sides with respect to this plane 13. This arrangement is due to that the outer ends of both series of spokes 11, 12 are connected at the inner wall 2 of rim 1 at a plurality of anchoring spots 14 defining a common median plane which is coincident with the above mentioned plane 13 orthogonal to the axis 7. Since the plane 13 of the anchoring spots 14 for the spokes is substantially equally spaced from the ends of hub 6, the presence of the freewheel unit 8 causes a positioning of the anchoring flanges 9, 10 which is not symmetrical with respect to the above mentioned plane 13. As a consequence of this, the angles α and β of the two spoke series 11, 12 on the left and right sides of the bicycle wheel are differ greatly from each other. This condition implies a great difference in the strains induced in the spokes on the right and left sides of the bicycle wheel during the assembling operations of the wheel, with detrimental consequences on the strength of the structure and the ability of the wheel to keep its operative characteristics with the time.

In order to decrease the above mentioned drawback, it is necessary to render the two angles α and β less different as possible. This result is achieved in the known rims indicated at the beginning of the present description by offsetting the median plane of the anchoring spots 14 of the spokes with respect to the median plane 13 of the rim. A known solution of this type is shown in FIG. 2 of the annexed drawings. As shown, in this figure the two angles are α' and β', less different from each other with respect to the case of FIG. 1, due to the offset ε between the median plane 13 of rim 1 and plane 15 containing the anchoring spots 14 of spokes 11, 12.

However, the offset ε between the median plane 13 of the rim and the plane 15 where the spokes are applied gives origin to a drawback. As a matter of fact, when the wheel is mounted and the spokes are tensioned, the cross-section of the rim is subjected to a torsioning torque tending to bring the resulting force of the spoke tensions on the median plane of the rim, with a resulting rotation of the cross-section, along with a deformation. This condition is shown in FIGS. 3–5 of the annexed drawings. FIG. 3 shows the cross-section of the rim before the deformation which is caused by the torsioning torque T generated by the resulting force F applied by the spokes. FIG. 4 shows the rotated condition of the rim and FIG. 5 shows the rim cross-section at an enlarged scale and shows the deformed condition by dotted lines which is generated in the situation of FIG. 4.

SUMMARY OF THE INVENTION

The object of the present invention is that of eliminating the above described drawback consisting in the rotation and deformation of the rim cross-section as shown in FIG. 3–5.

In view of achieving this object, the invention provides a rim for a bicycle spoked wheel, particularly a bicycle rear wheel, of the type comprising a hollow profile having a radially inner wall, a radially outer wall and two side portions connecting said walls to each other, said radially inner wall having a plurality of anchoring spots for the spokes, said anchoring spots lying on a plane offset with respect to a median plane orthogonal to the rim axis and equally spaced from the side portions thereof, characterized in that said profile has a reinforcing radial wall arranged within the cavity of the profile and connecting said radially inner wall to said radially outer wall, said reinforcing radial wall being also offset with respect to said median plane of the rim.

Preferably, said reinforcing radial wall and one of the rim side portions are located on opposite sides with respect to the plane of the spoke anchoring spots, at positions substantially equally spaced therefrom. In a preferred embodiment, said reinforcing radial wall and said side portion of the rim are shaped and arranged substantially symmetrically with respect to said plane of said anchoring spots.

According to a further important feature of the invention, at each anchoring spot the radially inner wall of the rim has a hole for passage of one end of the respective spoke, on which a locking element is to be mounted, a force distributing element being interposed between said locking element and the radially inner wall of the rim, said force distributing element being in contact both with said radially inner wall of the rim and with adjacent portions of one side portion of the rim and said reinforcing radial wall. Preferably, in a cross-section of the rim, said side portions have sections inclined with respect to a plane orthogonal to the rim axis, and converging radially inwardly towards each other, said reinforcing radial wall also having a cross-section with an inclined shape with respect to a plane orthogonal to the rim axis, which converges radially inwardly towards the plane of said anchoring spots.

Due to the above mentioned features, the tendency of the rim cross-section to rotate as a result of the tensions applied by the spokes is eliminated.

BRIEF DESCRIPTION OF THE DRAWINGS

The invention will be now described with reference to the annexed drawings, given purely by way of non limiting example, in which.

DETAILED DESCRIPTION OF THE INVENTION

Figure 1:
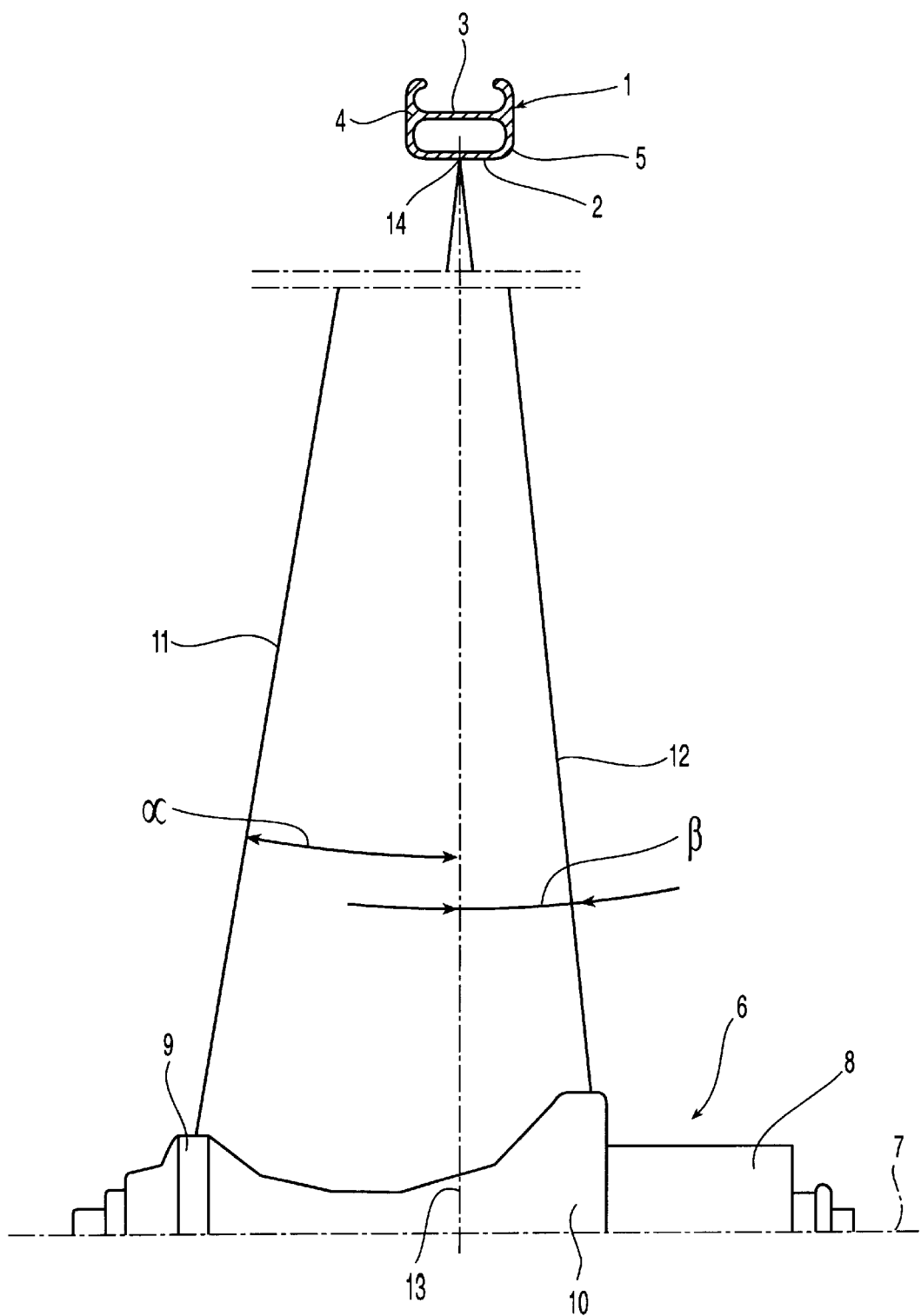
FIG. 1 is a cross-sectional view of a bicycle rear wheel comprising a rim according to the conventional art.
Figure 2:
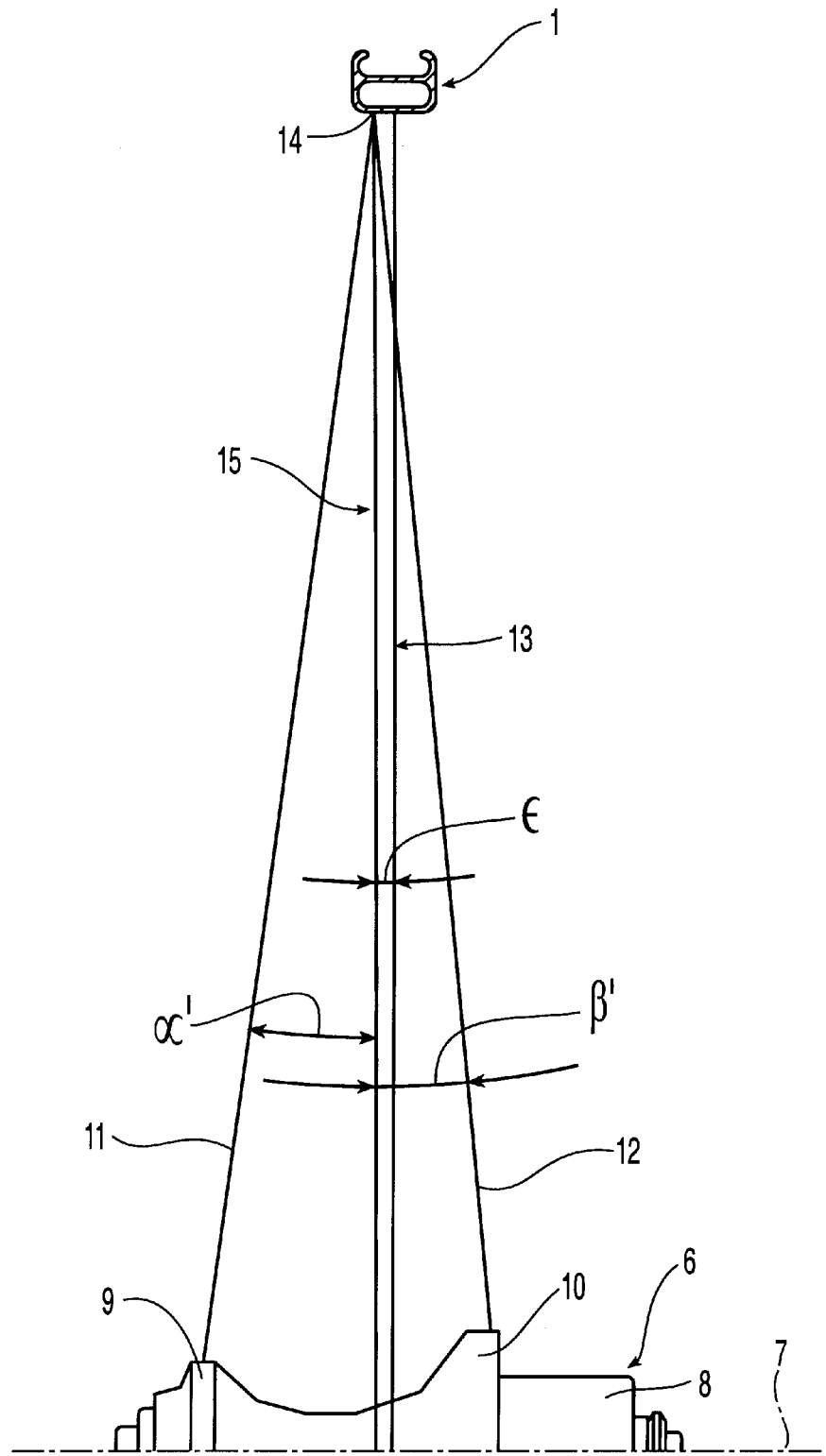
FIG. 2 is a cross-sectional view of a bicycle wheel according to the prior art, comprising a rim having a spoke application plane which is offset with respect to the rim median plane.
Figure 3:
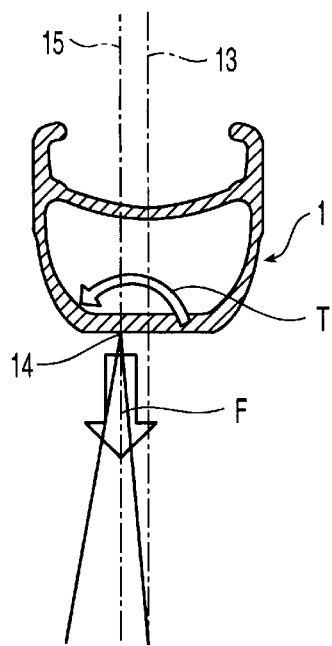
FIGS. 3–5 are, as already discussed, cross-sections of the rim of FIG. 2, which show the deformation of the cross-section caused by the spoke tensions.
Figure 4:
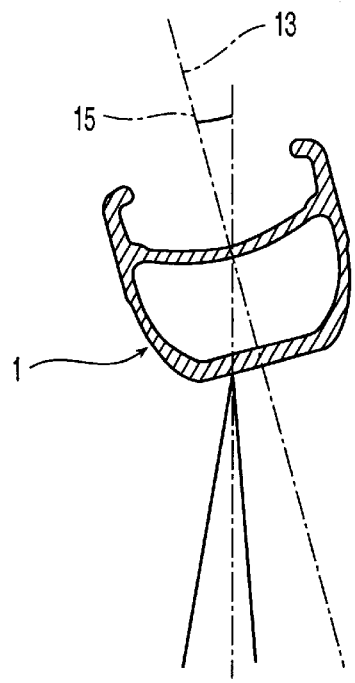
Figure 5:
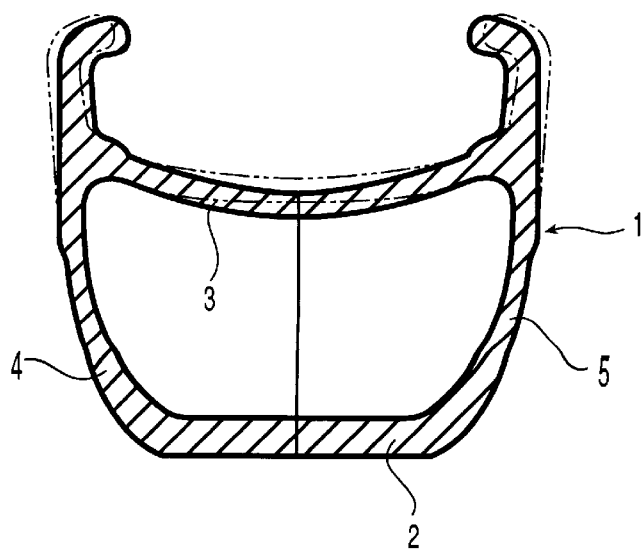
Figure 6:
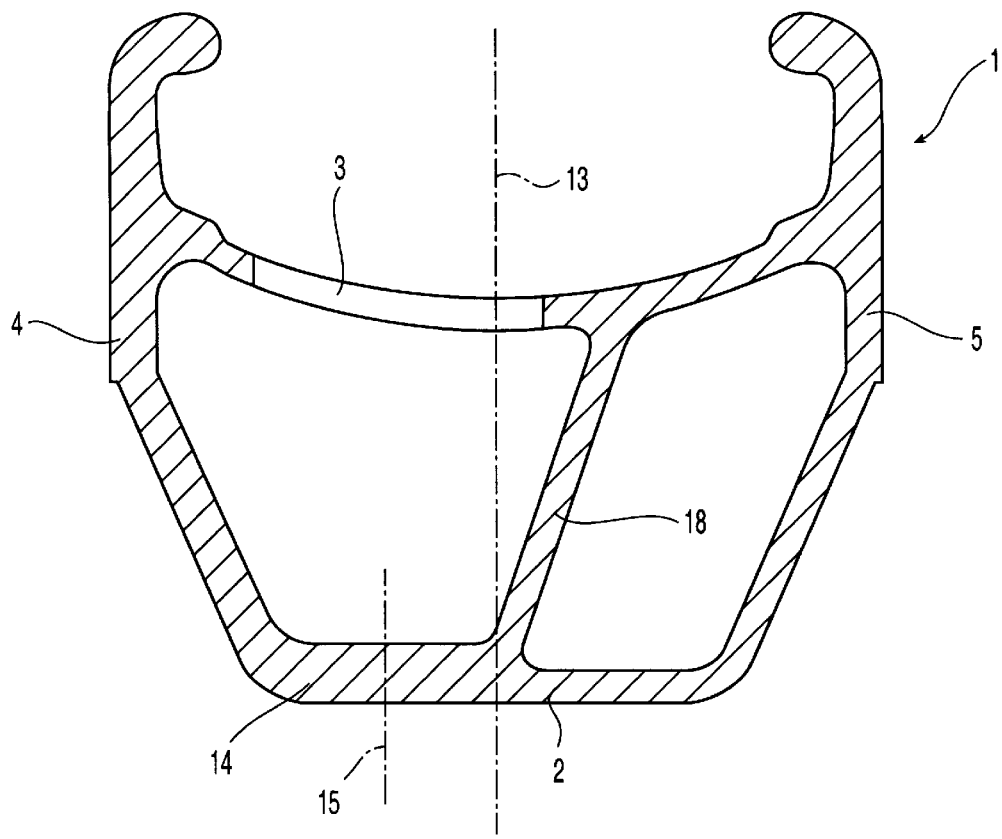
FIG. 6 is a cross-sectional view of a preferred embodiment of the rim according to the invention.

In FIG. 6, only the cross-section of the rim according to the invention has been shown. It is to be understood that this rim is to be mounted in a bicycle wheel in an identical manner to what has been illustrated with reference to FIG. 2. The parts which are common to this figure are designated in FIG. 6 with the same reference numeral. It is also to be noted that in FIG. 2 the connection of the spokes 11, 12 to the wheel hub 6 has not been shown in detail. This as been made on purpose, since this connection can be made in any known way and does not fall, taken alone, within the scope of the present invention. Also, the elimination of these detail of the drawings renders the latter simpler and easier to understand.

As shown in FIG. 6, also the rim according to the invention is made by a hollow profile, e.g. of metal material, comprising the radially inner wall 2, the radially outer wall 3 and the two side portions 4, 5 which in the illustrated example are inclined and converge radially inwardly towards the symmetry median plane 13 of the rim. Similarly to what has been shown with reference to FIG. 2, also in the case of the rim according to the invention the anchoring spots 14 of the spokes 11, 12 of the wheel lie on a plane 15 orthogonal to the rim axis and having an offset $\epsilon$ with respect to the median plane 13 of the rim. As shown in detail in FIG. 7, in the illustrated example each anchoring spot 14 is constituted by a through hole 140 formed in the wall 2 of the rim through which one end 12a of the respective spoke 12 is passed, on which a locking element 16 is mounted, e.g. a nut screwed on a threaded end portion of the spoke. In this case, according to an art known per se, the radially outer wall 3 of the rim 1 as apertures for allowing reaching each nut 16 by an operating tool. As clearly shown in FIGS. 6–8, the rim according to the invention defers from the rim according to the prior art shown in FIG. 2 since it has a reinforcing radial wall 18 connecting the inner wall 2 to the radially outer wall 3 and which is offset with respect to the median plane 13 of the rim, on the side opposite with respect to plane 15 of application of the spokes. In the illustrated embodiment, the reinforcing wall 18 and the side portion 4 have shaped and arrangement substantially symmetrical with respect to the plane 15 of application of this spokes. Furthermore, also in the case of the illustrated example, the radially inner wall 2 or the rim has an enlarged thickness in the portion between the side portion 4 and the reinforcing wall 18. Furthermore, with reference to FIG. 7, between the locking element 16 and the rim wall 2 there is interposed a force distributing element 19 which is in contact both with wall 2, and with adjacent portions of the side portion 4 and the reinforcing wall 18.

Due to the above described arrangement, the tension F of spoke 12 generates a horizontal component $F_o$ which is transmitted to the rim structure further contributing to stability of the cross-section. In the case of the spokes 11, a similar horizontal component is discharged on side portion 4 of the rim cross-section.

Figure 9:
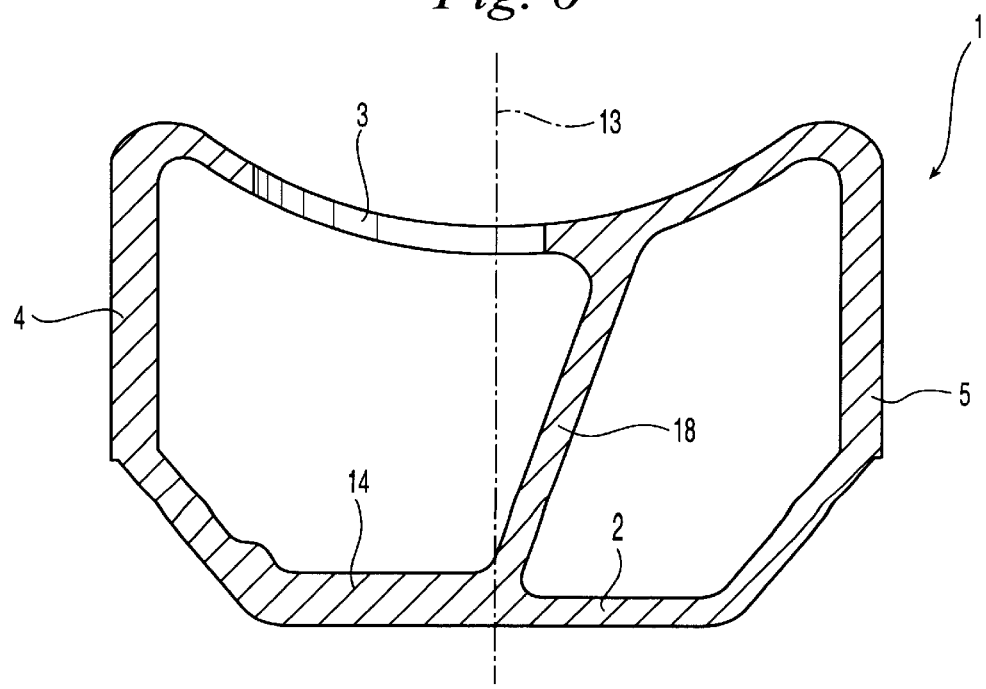
FIG. 9 shows a variant of FIG. 6.
Figure 7:
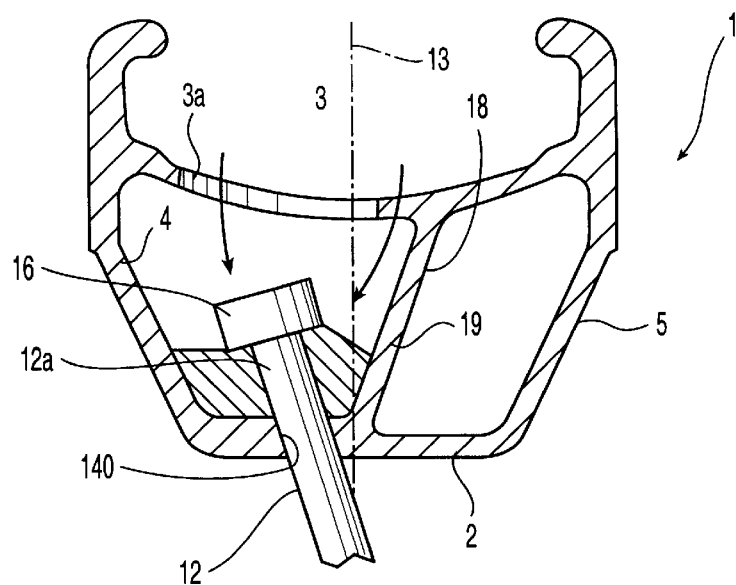
FIG. 7 is a cross-sectional view of the rim of FIG. 6 which also shows the end of a spoke connected to the rim.
Figure 8:
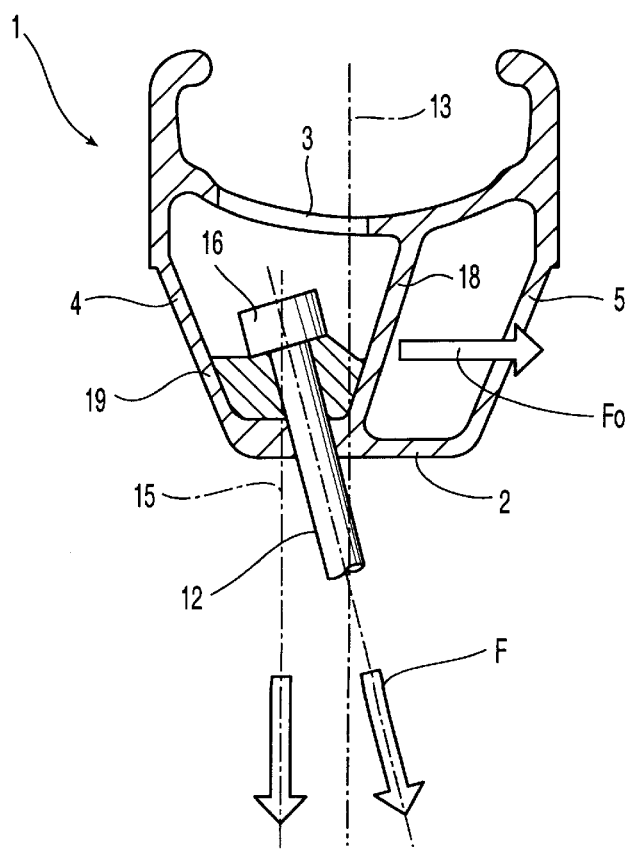
FIG. 8 is a cross-sectional view similar to that of FIG. 7 which shows the forces generated by the tension applied by a spoke.

Studies and tests conducted by the Applicant have shown the particular shape of the rim according to the invention shown in FIG. 6 efficiently solves the problem which is at the basis of the present invention, i.e. the elimination of the rotation of the cross-section of the rim generated by the spoke tension due to the offset of plane 15 of application of this spokes with respect to the median plane 13 of the rim. This result is further improved due to the arrangement of the force distributing element 19 and the shape thereof, as shown in FIGS. 7, 8. FIG. 9 shows a variant of the rim according to the invention for a tubular tire.

Naturally, while the principle of the invention remains the same, the details of construction and the embodiments may widely vary with respect to what has been described and illustrated purely by way of example. For instance, the specific shape of the rim cross-section could also be totally different from that shown in FIG. 6, although always having an inner wall 2, an outer wall 3, two side portions 4, 5 and a reinforcing wall 18 offset with respect to the median plane 13.

What is claimed is:

1. Rim for a bicycle wheel, comprising a hollow profile having a radially inner wall, a radially outer wall, and two side portions connecting said walls to each other, said radially inner wall having a plurality of anchoring spots for the spokes, said anchoring spots being arranged on a plane offset with respect to a median plane orthogonal to the axis of the rim and equally spaced from the side portions thereof, wherein said profile has a reinforcing radial wall arranged within the cavity of the profile and connecting said radially inner wall to said radially outer wall, said reinforcing radial wall being also offset with respect to said median plane of the rim, wherein said reinforcing radial wall and one of the side portions of the rim are located on opposite sides with respect to the plane of the anchoring spots for the spokes, at positions substantially equally spaced therefrom.

2. Rim for a bicycle spoked rear wheel, according to claim 1, wherein said reinforcing radial wall and one of the side portions of the rim are shaped and arranged substantially symmetrically with respect to the plane of said anchoring spots.

3. Rim for a bicycle spoked rear wheel, according to claim 2, wherein at each anchoring spot the radially inner wall of the rim has a hole for passage of one end of the respective spoke, on which a locking element is mounted, a force distributing element being interposed between said locking element and said radially inner wall, said force distributing element having a surface in contact with the radially inner wall and adjacent portions of a side portion of the rim and said radial reinforcing wall.

4. Rim for a bicycle spoked rear wheel, according to claim 3, wherein in a cross-section of the rim said side portions have sections inclined with respect to a plane orthogonal to the axis of the rim, converging radially inwardly towards each other, and said reinforcing radial wall also has a shape in cross-section which is inclined with respect to a plane orthogonal to the rim axis, converging radially inwardly towards the plane of said anchoring spots.

5. Rim for a bicycle spoked rear wheel, according to claim 4, wherein said radially inner wall has an enlarged thickness at a portion between said radial reinforcing wall and said side portion of the rim.

6. Rim for a bicycle wheel, comprising a hollow profile having a radially inner wall, a radially outer wall, and two side portions connecting said walls to each other, said radially inner wall having a plurality of anchoring spots for the spokes, said anchoring spots being arranged on a plane offset with respect to a median plane orthogonal to the axis of the rim and equally spaced from the side portions thereof, wherein said profile has a single reinforcing radial wall arranged within the cavity of the profile and connecting said radially inner wall to said radially outer wall, said reinforcing radial wall being also offset with respect to said median plane of the rim.

* * * * *